United States Patent [19]
Noguchi et al.

[11] Patent Number: 5,422,324
[45] Date of Patent: Jun. 6, 1995

[54] ALUMINUM TITANATE CERAMIC AND PROCESS FOR PRODUCING THE SAME

[75] Inventors: Yasushi Noguchi, Nagoya; Kaname Fukao, Inuyama; Shinichi Miwa, Tajima, all of Japan

[73] Assignee: NGK Insulators, Ltd., Nagoya, Japan

[21] Appl. No.: 949,586

[22] Filed: Sep. 23, 1992

[30] Foreign Application Priority Data

Sep. 30, 1991 [JP] Japan .................. 3-251994

[51] Int. Cl.$^6$ ............................ C04B 35/10
[52] U.S. Cl. .................. 501/128; 501/127; 501/134; 501/153
[58] Field of Search ............... 501/127, 128, 134, 153

[56] References Cited

U.S. PATENT DOCUMENTS

| | | | |
|---|---|---|---|
| 2,776,896 | 1/1957 | Harman et al. | 501/136 |
| 4,118,240 | 10/1978 | Takabatake | 106/73.33 |
| 4,767,731 | 8/1988 | Asami et al. | 501/128 |
| 4,895,815 | 1/1990 | Olapinski et al. | 501/134 |
| 5,008,222 | 4/1991 | Kameda | 501/134 |
| 5,055,434 | 10/1991 | Thometzek et al. | 501/127 |
| 5,066,626 | 11/1991 | Fukao et al. | 501/128 |
| 5,153,153 | 10/1992 | Freudenberg et al. | 501/127 |

FOREIGN PATENT DOCUMENTS

| | | |
|---|---|---|
| 0285312 | 10/1988 | European Pat. Off. . |
| 0335681A | 10/1989 | European Pat. Off. . |
| 0336044A | 10/1989 | European Pat. Off. . |
| 0339379A | 11/1989 | European Pat. Off. . |
| 0360564 | 3/1990 | European Pat. Off. . |
| 0372868 | 6/1990 | European Pat. Off. . |
| 3706209 | 10/1987 | Germany . |
| 3907048 | 10/1989 | Germany . |
| 3915496 | 11/1990 | Germany . |
| 4029166 | 1/1992 | Germany . |
| 60-5544 | 2/1985 | Japan . |
| 62-21756 | 1/1987 | Japan . |
| 1-164760 | 6/1989 | Japan . |
| 4-228471 | 8/1992 | Japan . |

OTHER PUBLICATIONS

Pohlmann et al., "Untersuchungen an Werkstoffen im System $Al_2O_3$-$TiO_2$-$SiO_2$", 1975, pp. 179–183, Ber. Dt. Keram. Ges. 52 (1975) No. 6.

Primary Examiner—Mark L. Bell
Assistant Examiner—Michael Marcheschi
Attorney, Agent, or Firm—Adduci, Mastriani, Schaumberg & Schill

[57] ABSTRACT

The present invention provides an aluminium titanate ceramic composed of, as main crystalline phases, 60–85% of an aluminum titanate phase, 10–25% of a rutile phase, 2–10% of a corundum phase and 2–10% of a mullite phase, wherein the amount of vitreous phase is 5% or less. The aluminum titanate ceramic is superior in both heat cycle durability and casted property.

3 Claims, 1 Drawing Sheet

ALUMINUM TITANATE CERAMIC AND PROCESS FOR PRODUCING THE SAME

BACKGROUND OF THE ART AND RELATED ART STATEMENT

The present invention relates to an aluminum titanate ceramic and a process for producing said aluminum titanate ceramic. More particularly, the present invention relates to an aluminum titanate ceramic used in, for example, a head port liner, an exhaust manifold liner (these liners are for the heat insulation of the inside of an engine exhaust pipe) and a catalytic converter, as well as to a process for producing said aluminum titanate ceramic.

A ceramic using aluminum titanate as a base material has a low thermal expansion coefficient and a small Young's modulus. Hence, it is suitable for use in various members used under severe conditions in which the members are required to have high thermal shock resistance and low thermal expansion, for example, a head port liner, an exhaust manifold liner (these liners are for the heat insulation of the inside of a gasoline engine exhaust pipe) and a catalytic converter.

It is known that in ordinary aluminum titanate (aluminum titanate is hereinafter referred to as AT) ceramic materials, the Young's modulus and the strength are generally proportional to each other. That is, as the strength is higher, the Young's modulus is larger. Conversely, as the strength is lower, the Young's modulus is smaller. This is because when an AT ceramic material has a low strength, the crystal grains of the AT ceramic material are generally large and a number of cracks exist between the grain boundaries, allowing the AT ceramic material to be easily deflected and lowering its strength. Many of conventional AT ceramic materials have a Young's modulus of about 2,000 kgf/mm$^2$ or more and a bending strength of 2–5 kgf/mm$^2$.

Various improvements have been made for AT ceramic materials, depending upon their applications, by, for example, appropriately selecting the composition or adding appropriate additives. Japanese Patent Publication No. 5544/1985, for example, proposes a silicate-containing aluminum titanate ceramic material made of raw materials comprising 50–60% by weight of $Al_2O_3$, 40–45% by weight of $TiO_2$, 2–5% by weight of kaolin and 0.1–1% by weight of magnesium silicate.

Japanese Patent Application Kokai (Laid-Open) No. 21756/1987 proposes an aluminum titanate-mullite ceramic material having the following composition:

MgO: 0.8 or less
$Al_2O_3$: 53–74%
$TiO_2$: 14–33%
$Fe_2O_3$: 1.2–5%
$SiO_2$: 6–20%
$CaO+Na_2O+K_2O$: 0.3% or less wherein the amount of vitreous phase in the mullite matrix of ceramic is 5% or less when measured on a section of ceramic.

Japanese Patent Application Kokai (Laid-Open) No. 164760/1989 proposes a shaped sintered material composed basically of aluminum titanate, which is produced from mixed raw materials consisting of 46% by weight or more of $TiO_2$, 49.5% by weight or less of $Al_2O_3$, 3–5% by weight of $SiO_2$ and 0.2% by weight or less of impurities, the weight ratio of $Al_2O_3$ and $TiO_2$ being 1:0.95 to 1:1.05.

The ceramic proposed in Japanese Patent Publication No. 5544/1985 has a low Young's modulus and excellent casting property when used as a material to be cast by metal, but has the following problems. That is, the ceramic contains a magnesium silicate vitreous phase; when the ceramic is used in a heat cycle wherein high-temperature heating and cooling are repeated, the vitreous phase present at the grain boundaries moves during high temperatures; consequently, the grain boundary strength is reduced, cracks are developed at the grain boundaries, and there occurs deterioration in strength; thus, the ceramic has poor heat cycle durability. Further, the ceramic has low acid resistance owing to the presence of said vitreous phase.

The ceramic proposed in Japanese Patent Application Kokai (Laid-Open) No. 21756/1987 has excellent heat cycle durability and is useful as a material for use in a head port liner, etc. However, the ceramic, when containing mullite in a large amount, has a high Young's modulus and shows an inferior casting property, when used as a material to be cast by metal.

The ceramic proposed in Japanese Patent Application Kokai (Laid-Open) No. 16470/1989 has excellent heat cycle durability and acid resistance but, containing $TiO_2$ in a large amount and consequently showing, when polished, a structure free from cracks, has a high Young's modulus and an inferior casting property.

SUMMARY OF THE INVENTION

The present invention is intended to solve the above-mentioned problems of conventional AT ceramic materials and provide an AT ceramic material having excellent heat cycle durability and a superior casting property.

According to the present invention, there is provided an aluminum titanate ceramic comprising, as main crystalline phases, 60–85% of an aluminum titanate phase, 10–25% of a futile phase, 2–10% of a corundum phase and 2–10% of a mullite phase, wherein the amount of vitreous phase is 5% or less.

According to the present invention, there is further provided a process for producing the aluminum titanate ceramic mentioned above, which comprises subjecting a mixed raw material powder consisting of 51.7–56.5% by weight of $Al_2O_3$, 40.2–45.0% by weight of $TiO_2$, 2.0–5.0% by weight of $SiO_2$, 0.04% by weight or less of MgO and 0.1% by weight or less of a total of alkali metal and alkaline earth metal components consisting of CaO, $Na_2O$ and $K_2O$ to shaping, drying and sintering.

The aluminum titanate ceramic of the present invention has the above composition and comprises, as crystalline phases, not only an aluminum titanate phase but also a futile phase, a corundum phase and a mullite phase, wherein the amount of vitreous phase is controlled so as not to exceed 5% by weight; thereby, the present ceramic has excellent heat cycle durability and a superior casting property.

The reasons for excellent heat cycle durability and superior casting property are presumed to be as follows.

Firstly, conventional aluminum titanate ceramics of the $Al_2O_3$—$TiO_2$—$SiO_2$ type are generally produced by using natural minerals, etc. as raw materials, for example, clay, etc. as a $SiO_2$ source; as a result, most of the conventional AT ceramic materials contain a vitreous phase in an amount more than required, owing to the presence of small amounts of impurities in said clay, etc. and, when used in, for example, a head port liner, are corroded by exhaust gas from the engine and show poor durability. Meanwhile, the AT ceramic of the present invention has excellent acid resistance and high durability because it contains a very small amount of vitreous phase.

Secondly, in the AT ceramic of the present invention, since the MgO content in raw materials is 0.04% by weight or less, the growth of AT crystal grains is suppressed and the size of AT crystal grains in the AT ceramic is small; the amount of vitreous phase in AT ceramic is very small; as a result, the grain boundary strength is very high. Meanwhile, the crystal grains of futile, corundum and mullite contained in the present AT ceramic have higher strengths than the AT crystal grains; hence, the residual stress generated owing to the anisotropy of AT crystal grains is accumulated and stored in a large amount in the AT ceramic. This residual stress in storage is released at once upon generation of any crack; and cracks are generated in the lengthwise direction of each AT crystal grain. Cracks, however, are not generated along the grain boundaries; therefore, the cracks contribute to a superior casting property but do not grow during heat cycle.

DETAILED DESCRIPTION OF THE INVENTION

Figure 1:
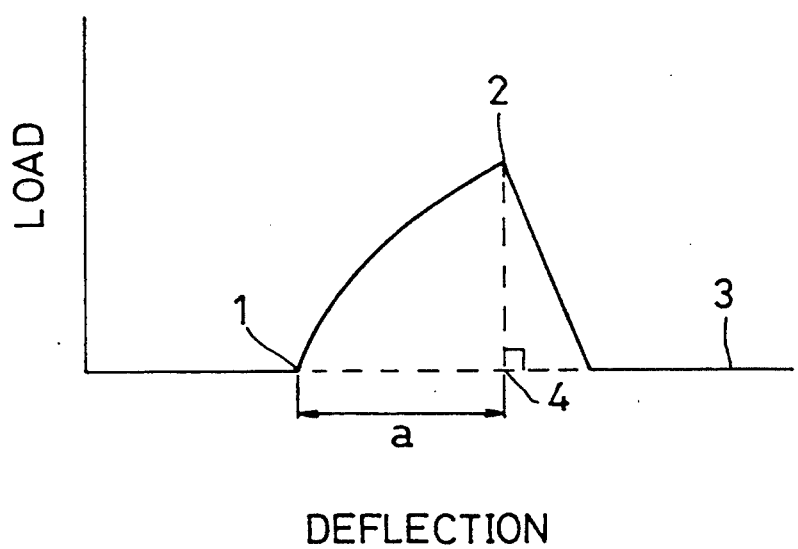
FIG. 1 shows a relation between deflection and load in four-point bending strength test (JIS R 1601), of a ceramic sample.

The present invention is hereinafter described in more detail.

In the AT ceramic of the present invention, the basic components constituting the ceramic are three components, i.e., $Al_2O_3$, $TiO_2$ and $SiO_2$. The main crystalline phases consist basically of four phases, i.e., 60-85% of an aluminum titanate ($Al_2TiO_5$) phase, 10-25% of a rutile ($TiO_2$) phase, 2-10% of a corundum ($Al_2O_3$) phase and 2-10% of a mullite ($3Al_2O_3.2SiO_2$) phase. The vitreous phase is controlled so as not to exceed 5%. Part of the aluminum titanate phase may contain a solid solution of aluminum titanate.

When the proportions of the crystalline phases are outside the above ranges, the resulting AT ceramic has poor heat cycle durability and an inferior casting property, making it difficult to obtain a desired AT ceramic. Particularly when the amount of vitreous phase is more than 5%, the resulting AT ceramic is low not only in acid resistance and heat cycle durability but also in the casting property.

In the present invention, the proportion of each crystalline phase is determined by the method described later.

The composition of the present AT ceramic consists of, when expressed in oxides, 51.7-56.5% by weight of $Al_2O_3$, 40.2-45.0% by weight of $TiO_2$, 2.0-5.0% by weight of $SiO_2$, 0.4% by weight or less of MgO and 0.1% by weight or less of a total of alkali metal and alkaline earth metal components consisting of CaO, $Na_2O$ and $K_2O$. This composition is substantially the same as that of the raw materials and can be obtained by preparing each raw material so as to fall in the above range. When each component of the AT ceramic is outside the above range, it is impossible to obtain an AT ceramic satisfactory in both casting property and heat cycle durability. In the AT ceramic of the present invention, the content of $Fe_2O_3$ is preferably 1.0% by weight or less. When $Fe_2O_3$ is contained in a large amount, the resulting AT ceramic has a high Young's modulus and low casting property.

The source (raw material) of each oxide component is described. As the source for $Al_2O_3$, there can be used, for example, α-alumina, calcined bauxite, aluminum sulfate, aluminum chloride and aluminum hydroxide. As the source for $TiO_2$, there can be used, for example, futile and anatase. As the source for $SiO_2$, there can be used, for example, silica glass, kaolin, mullite and quartz.

In the raw materials for the present AT ceramic, the MgO content and the total content of alkali metal and alkaline earth metal components (CaO, $Na_2O$ and $K_2O$) are selected so as to be 0.04% by weight or less and 0.1% by weight or less, respectively. The $Fe_2O_3$ content is selected so as to be 0.1% by weight or less. It is preferable to use α-alumina, in particular, low-sodium α-alumina as the $Al_2O_3$ source, rutile type titania as the $TiO_2$ source and kaolin as the $SiO_2$ source.

In the present invention, the raw materials each of a fine powdery state are mixed in the above composition, and the mixture is shaped in a desired form and sintered according to known methods to obtain an AT ceramic. In this case, each of the raw materials preferably has an average particle diameter of about 5 μm or less. When the average particle diameters of the raw materials are larger than 5 μm, the reactivity between the raw materials is low, making it difficult to obtain desired crystals. Preferably, the particle diameters of the raw materials are selected so that the AT crystal grains of the AT ceramic obtained have an average particle diameter of 4 μm or less. When the AT crystal grains are large, cracks are generated along the grain boundaries rather than in the lengthwise direction of each grain.

As the method for shaping, there can be used any known shaping method such as hot pressing, cast molding, rubber pressing or the like. The temperature for sintering can be similar to the temperature employed for sintering of ordinary ceramics, but is preferably 1,350°-1,450° C. This temperature range is necessary to keep the proportions of the futile crystalline phase and the corundum crystaline phase in their respective ranges mentioned above. In the shaping and sintering, there may be appropriately added a shaping aid, a deflocculant, a sintering aid, etc.

The present AT ceramic obtained as above, preferably has a breaking strain of $3 \times 10^{-3}$ or more. When the breaking strain is less than $3 \times 10^{-3}$, the resulting AT ceramic has low casting property. The present AT ceramic preferably has a four-point bending strength of 3.0 kgf/mm$^2$ or more. When the four-point bending strength is less than 3.0 kgf/mm$^2$, the resulting AT ceramic has poor heat cycle durability.

The present invention is hereinafter described specifically by way of Examples. However, the present invention is not restricted by these Examples.

In the present Examples, proportions of crystalline phases, amount of vitreous phase, Young's modulus, breaking strain, heat cycle durability and acid resistance were measured in accordance with the following test methods.

(1) Proportions of crystalline phases

An AT ceramic was subjected to X-ray diffraction analyses and measured for the integral intensities $I_{AT}$, $I_{Ru}$, $I_{Mu}$ and $I_{Co}$ of the AT phase, futile phase (hereinafter referred to as Ru phase), mullite phase (hereinafter referred to as Mu phase) and corundum phase (hereinafter referred to as Co phase). Then, the proportion of each crystalline phase was calculated using the following formula:

$$AT \text{ phase } (\%) = [I_{AT}/I] \times 100$$

$$Ru \text{ phase } (\%) = [I_{Ru}/I] \times 100$$

$$Mu \text{ phase } (\%) = [[I_{Mu}/0.95]/I] \times 100$$

$$Co \text{ phase } (\%) = [[I_{Co}/0.75]/I] \times 100$$

wherein $I = I_{At} + I_{Ru} + I_{Mu}/0.95 + I_{Co}/0.75$

TABLE 1

| Crystalline phase | Test method | Peak used d (A) | 2θ (°) | Intensity ratio |
|---|---|---|---|---|
| AT phase | ASTM 26-40 | 3.356 | 26.6 | 100 |
| Ru phase | ASTM 4-0551 | 3.245 | 27.5 | 100 |
| Mu phase | ASTM 15-776 | 3.428 | 26.0 | 95 |
| Co phase | ASTM 10-173 | 3.479 | 25.6 | 75 |

(2) Amount of vitreous phase

One of the conventional AT materials had polygonal portions surrounded by mullite crystals, in the mullite matrix. These portions, when subjected to chemical analysis, showed a composition approximately consisting of 68% of $SiO_2$, 24% of $Al_2O_3$, 4.4% of $TiO_2$, 1.0% of CaO and 2.0% of KNaO. The composition is substantially the same as that of vitreous phase.

In the present invention, these polygonal portions were taken as a vitreous phase in mullite matrix. Accordingly, the vitreous phase in the present invention is a value obtained by, in the scanning electron micrograph taken for polished section of sintered AT ceramic, excluding the areas of pores and AT crystalline phase, then measuring, on the remaining area, the mullite matrix portion (MuS) and the vitreous phase portion (GS) using a planimeter, and making a calculation using the following formula.

$$\text{Vitreous phase } (\%) = [GS/MuS] \times 100$$

(3) Young's modulus

Was measured using the three-point bending and deflection angle of JIS R 1602. In this case, the load was varied from 0 to 150 gf.

(4) Breaking strain

Was measured according to the same test method as that used for measurement of the four-point bending strength of ceramics, specified by JIS R 1601. That is, for a sample having a thickness "t" (mm), the deflection shown by the sample during a period from the start of load application to the destruction of the sample was taken, in FIG. 1 showing a from a point 1 (start of load application) to a point 4 (an intersection between a base line 3 and a perpendicular drawn from a destruction point 2 to the base line 3; then, the breaking strain of the sample was calculated from "a" and "t" using the following formula.

$$\text{Breaking strain} = 6 \cdot a / 1000$$

Incidentally, this breaking strain is a quotient when bending strength is divided by Young's modulus determined from the deflection at the destruction point. A larger breaking strain gives superior casting property.

(5) Heat cycle durability

A sample specified by JIS R 1601 was heated for 20 minutes in a furnace of 900° C., then taken out and cooled by air flow for 10 minutes. This heat cycle procedure was repeated 600 times. The sample was measured for four-point bending strengths $\sigma_0$ (before heat cycle) and $\sigma_1$ (after heat cycle) by JIS R 1601.

From the thus obtained $\sigma_0$ and $\sigma_1$, the heat cycle strength deterioration (%) of the sample was calculated using the following formula.

$$\text{Heat cycle strength deterioration } (\%) = [(\sigma_1 - \sigma_0)/\sigma_0] \times 100$$

(6) Acid resistance

Five same AT ceramic samples each having a square plate shape [10 mm × 10 mm × 3 mm (thickness)] were prepared and measured for respective weights ($m_o$). Then, they were dipped in 100 ml of a 10% aqueous hydrogen chloride solution and allowed to stand for 24 hours at 90° C., using a hot water bath. Thereafter, they were taken out, washed, dried and measured for respective weights ($m_1$). The acid resistance of each sample was calculated from the $m_0$ and $m_1$, using the following formula.

$$\text{Acid resistance } (\%) = [(m_0 - m_1)/m_0] \times 100$$

The average of the acid resistances of the five samples was taken as the acid resistance of the AT ceramic tested.

EXAMPLES 1-6

There were weighed, as raw materials, fine powders of low-sodium α-alumina having an average particle diameter of 1.8 μm, rutile type titania having an average particle diameter of 0.2 μm and high-purity kaolin having an average particle diameter of 3 μm, so as to give a composition shown in Table 2 or 3. The three powders were uniformly mixed. To the mixture was added 1.5% by weight of a binder. The resulting mixture was subjected to further mixing and vacuum degassing. The thus obtained mixture was cast-molded in a gypsum mold to obtain a shaped material.

The shaped material was subjected to normal-pressure sintering at a temperature shown in Table 2 or 3, to obtain a sintered AT material.

The sintered AT material was measured for proportions of crystalline phases, amount of vitreous phase, Young's modulus, breaking strain, heat cycle durability and acid resistance. The results are shown in Tables 2 and 3.

TABLE 2

| | Example | | | |
|---|---|---|---|---|
| | 1 | 2 | 3 | 4 |
| Composition (% by weight) | | | | |
| $Al_2O_3$ | 54.2 | 51.7 | 56.5 | 53.0 |
| $TiO_2$ | 42.5 | 45.0 | 40.2 | 42.0 |

TABLE 2-continued

|  | Example 1 | Example 2 | Example 3 | Example 4 |
|---|---|---|---|---|
| $SiO_2$ | 3.3 | 3.3 | 3.3 | 5 |
| $Fe_2O_3$ | <0.05 | <0.05 | <0.05 | <0.05 |
| MgO | <0.04 | <0.04 | <0.04 | <0.04 |
| $CaO + Na_2O + K_2O$ | <0.05 | <0.05 | <0.05 | <0.05 |
| Proportions of crystalline phases (%) | | | | |
| AT phase | 78 | 70 | 80 | 60 |
| Ru phase | 15 | 18 | 10 | 25 |
| Mu phase | 5 | 10 | 2 | 5 |
| Co phase | 2 | 2 | 8 | 10 |
| Vitreous phase | <1 | <1 | <1 | <1 |
| Sintering temperature (°C.) | 1400 | 1375 | 1425 | 1350 |
| Four-point bending strength (kgf/mm$^2$) | 4.0 | 4.2 | 4.4 | 5.0 |
| Young's modulus (%) | 1900 | 2100 | 2000 | 2500 |
| Breaking strain ($\times 10^{-3}$) | 3.3 | 3.1 | 3.2 | 3.0 |
| Heat cycle strength deterioration (%) | −1 | 0 | −2 | 0 |
| Acid resistance (%) | 0.2 | 0.3 | 0.2 | 0.3 |

TABLE 3

|  | Example 5 | Example 6 |
|---|---|---|
| Composition (% by weight) | | |
| $Al_2O_3$ | 55.0 | 54.0 |
| $TiO_2$ | 43.0 | 42.0 |
| $SiO_2$ | 2 | 3 |
| $Fe_2O_3$ | <0.05 | 1 |
| MgO | <0.04 | 0.04 |
| $CaO + Na_2O + K_2O$ | <0.05 | 0.1 |
| Proportions of crystalline phases (%) | | |
| AT phase | 85 | 75 |
| Ru phase | 11 | 15 |
| Mu phase | 2 | 3 |
| Co phase | 2 | 2 |
| Vitreous phase | <1 | 5 |
| Sintering temperature (°C.) | 1450 | 1400 |
| Four-point bending strength (kgf/mm$^2$) | 3.0 | 4.8 |
| Young's modulus (%) | 1500 | 2300 |
| Breaking strain ($\times 10^{-3}$) | 3.5 | 3.0 |
| Heat cycle strength deterioration (%) | −3 | 2 |
| Acid resistance (%) | 0.2 | 0.5 |

EXAMPLES 1–7

Fine powders of raw materials were weighed so as to give a composition shown in Table 4 or 5. Using the fine powders, a sintered AT material was obtained in the same manner as in Example 1. Incidentally, the sintered AT material of Comparative Example 1 was obtained in the procedure as described in Japanese Patent Publication No. 5544/1985 mentioned above; the sintered AT material of Comparative Example 2 was obtained in the same procedure as described in Japanese Patent Application Kokai (Laid-Open) No. 21756/1987 mentioned above; and the sintered AT material of Comparative Example 3 was obtained in the same procedure as described in Japanese Patent Application Kokai (Laid-Open) No. 164760/1989 mentioned above.

Each of the sintered AT materials was measured for proportions of crystalline phases, amount of vitreous phase, Young's modulus, breaking strain, heat cycle durability and acid resistance. The results are shown in Tables 4 and 5.

TABLE 4

|  | Comparative Example 1 | Comparative Example 2 | Comparative Example 3 | Comparative Example 4 |
|---|---|---|---|---|
| Composition (% by weight) | | | | |
| $Al_2O_3$ | 53.0 | 62.8 | 49.0 | 54.2 |
| $TiO_2$ | 43.5 | 21.8 | 47.0 | 42.3 |
| $SiO_2$ | 2.8 | 12.5 | 4 | 3.3 |
| $Fe_2O_3$ | <0.05 | 2.4 | <0.05 | <0.05 |
| MgO | 0.2 | 0.3 | <0.05 | <0.04 |
| $CaO + Na_2O + K_2O$ | 0.5 | 0.19 | <0.05 | <0.05 |
| Proportions of crystalline phases (%) | | | | |
| AT phase | 76 | 69 | 68 | 95 |
| Ru phase | 10 | 0 | 18 | 0 |
| Mu phase | 0 | 31 | 13 | 5 |
| Co phase | 4 | 0 | 1 | 0 |
| Vitreous phase | 10 | <1 | <1 | <1 |
| Sintering temperature (°C.) | 1400 | 1600 | 1430 | 1500 |
| Four-point bending strength (kgf/mm$^2$) | 3.2 | 4.1 | 3.9 | 2.2 |
| Young's modulus (%) | 1300 | 2900 | 2800 | 1100 |
| Breaking strain ($\times 10^{-3}$) | 4.0 | 2.2 | 2.0 | 4.2 |
| Heat cycle strength deterioration (%) | 26 | −1 | 0 | 33 |
| Acid resistance (%) | 7.6 | 1.2 | 0.3 | 0.3 |

TABLE 5

|  | Comparative Example 5 | Comparative Example 6 | Comparative Example 7 |
|---|---|---|---|
| Composition (% by weight) | | | |
| $Al_2O_3$ | 54.2 | 54.0 | 53.0 |
| $TiO_2$ | 42.3 | 42.3 | 42.0 |
| $SiO_2$ | 3.3 | 3.0 | 3 |
| $Fe_2O_3$ | <0.05 | <0.05 | 2.5 |
| MgO | <0.04 | <0.04 | <0.05 |
| $CaO + Na_2O + K_2O$ | <0.05 | 0.5 | <0.05 |
| Proportions of crystalline phases (%) | | | |
| AT phase | 50 | 77 | 80 |
| Ru phase | 27 | 10 | 13 |
| Mu phase | 5 | 2 | 5 |
| Co phase | 18 | 2 | 2 |

TABLE 5-continued

| | Comparative Example | | |
|---|---|---|---|
| | 5 | 6 | 7 |
| Vitreous phase | <1 | 9 | <0 |
| Sintering temperature (°C.) | 1300 | 1400 | 1400 |
| Four-point bending strength (kgf/mm$^2$) | 6.6 | 3.6 | 5.1 |
| Young's modulus (%) | 3100 | 1800 | 3100 |
| Breaking strain (× 10$^{-3}$) | 2.6 | 3.2 | 2.4 |
| Heat cycle strength deterioration (%) | −2 | 30 | 2 |
| Acid resistance (%) | 0.2 | 6.4 | 0.4 |

As is clear from the above Examples and Comparative Examples, the sintered AT materials of the present invention are equivalent or superior to conventional sintered AT materials (Comparative Examples), in breaking strain. Also in heat cycle strength deterioration, most of the sintered AT materials of the present invention are equivalent or superior to conventional sintered AT materials.

The sintered AT material of Comparative Example 1 has a large breaking strain but shows a large heat cycle strength deterioration and a high acid resistance, i.e. poor durability. The sintered AT materials of Comparative Examples 2 and 3 each have an excellent heat cycle strength deterioration and an excellent acid resistance but shows a small breaking strain. Thus, none of the conventional sintered AT materials tested are excellent in both casting property and heat cycle durability.

In contrast, the sintered AT materials of the present invention are excellent in casting property and heat cycle durability.

The present aluminum titanate ceramic has superior casting property and high heat cycle durability, and is suitably used as a material to be casting by metal, for example, a head port liner in gasoline engine, and also as an engine head port material. Thus, it has an industrial utility.

What is claimed is:

1. An aluminum titanate ceramic consisting essentially of, on a basis of oxides, 51.7% to 56.5% by weight of $Al_2O_3$, 40.2% to 45.0% by weight of $TiO_2$, 2.0% to 5.0% by weight of $SiO_2$, an amount of MgO not exceeding 0.04% by weight, an amount of $Fe_2O_3$ not exceeding 1.0% by weight, and a total amount of CaO, $Na_2O$, and $K_2O$ not exceeding 0.1% by weight, said ceramic being sintered at a temperature in a range from about 1350° C. to about 1450° C., said ceramic having a crystalline phase comprised of 60% to 85% of an aluminum titanate phase, 10% to 25% of a rutile phase, 2% to 10% of a corundum phase, and 2% to 10% of a mullite phase, and said ceramic further having 5% or less of a vitreous phase.

2. The aluminum titanate ceramic of claim 1, wherein a portion of said aluminum titanate phase contains a solid solution of aluminum titanate.

3. The aluminum titanate ceramic of claim 1, wherein said ceramic has a breaking strain of $3 \times 10^{-3}$ or more and a four-point bending strength of at least 3.0 kgf/mm$^2$.

* * * * *